Patented Sept. 29, 1942

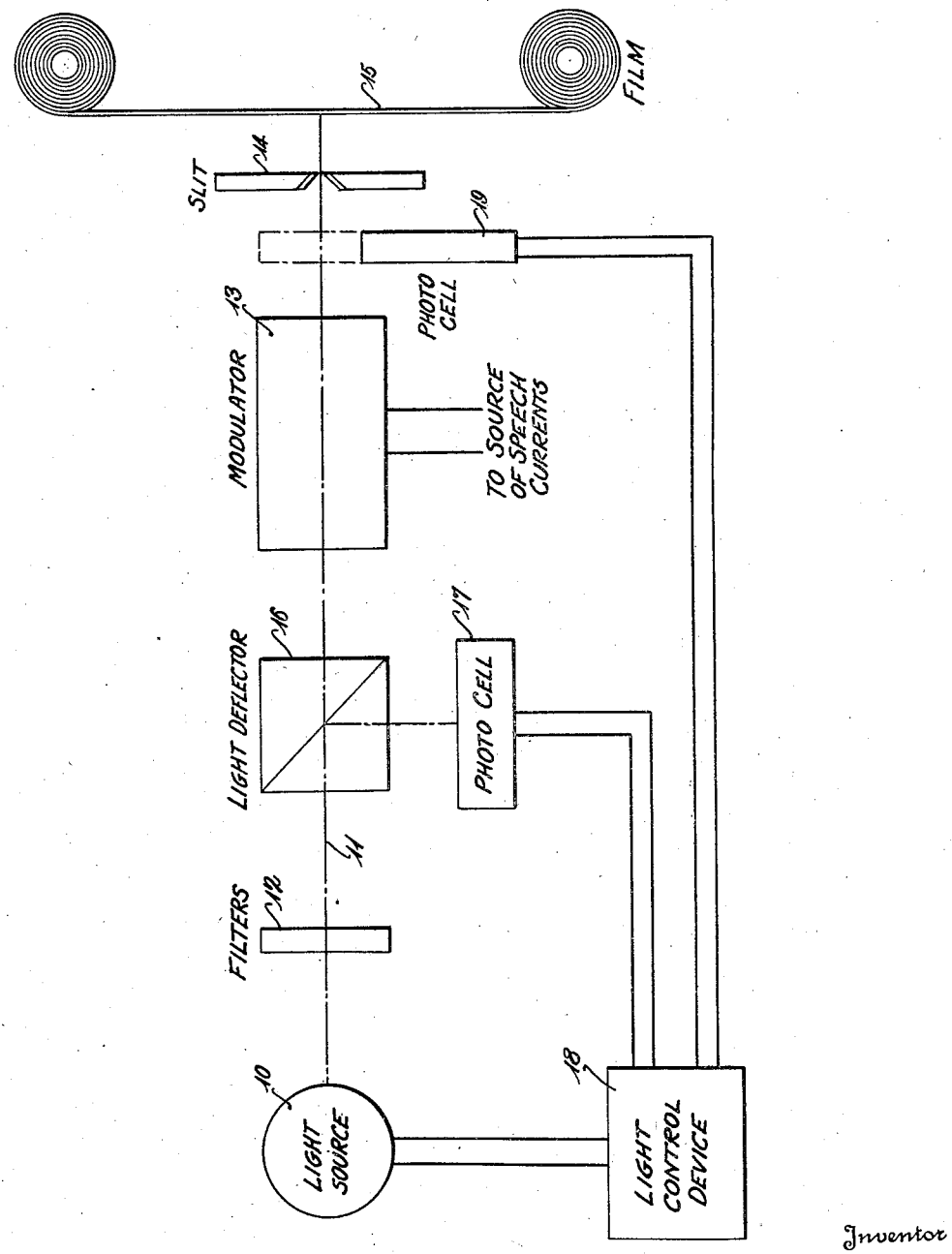

2,297,450

UNITED STATES PATENT OFFICE 2,297,450

CONTROLLING THE EXPOSURE OF PHOTOGRAPHIC SOUND RECORDS

Carlheinz Becker, Berlin-Wilmersdorf, Germany; vested in the Alien Property Custodian Application August 27, 1940, Serial No. 354,460
In Germany March 18, 1939

1 Claim. (Cl. 179—100.3)

This invention relates generally to methods of photographically recording sound and in particular is concerned with a novel method for controlling the light source used in the recording operations.

As is well known, in the making of photographic sound records, a monochromatic and more particularly an ultra-violet light source is used, the intensity of which is usually measured by means of photo-electric cells. In the making of half-wave intensity records (push-pull class B records) an exposure exactly defined with regard to intensity and wave length is absolutely required. A sufficiently exact control of this exposure must be possible at any time, including during the taking of a record. The principal means for achieving this effect is by the use of a source of light rigorously controlled to emit a pure sinusoidal light beam. It has been found, however, that with photo-electric cells a pure sinusoidal light in a physical sense is not obtained and hence a quantitative exposure or measurement of the exposure cannot be attained.

In accordance with the present invention, an exactly defined exposure is obtained during the making of half-wave sound records by using as a source of pure sinusoidal light a special mercury vapor lamp. In this novel lamp the vapor pressure is so chosen as to provide a sufficient surface brightness although the pressure is low enough that the intensity of the continuous spectrum of the mercury vapor is so small that it has no photographic effectiveness with regard to the line spectrum (3650 Å. U., Angström units, 4050 Å. U., 4365 Å. U.). As can be ascertained by experimental tests, this optimum vapor pressure is of the order of magnitude of 10 atm.

By means of a conventional filter combination, arranged between the source of light and the film upon which the records are to be made, the desired operating portion of the spectrum is filtered out of the line spectrum of the lamp so that the light used in making the records is of an exactly defined monochromatic nature and completely independent of the operating conditions of the mercury vapor lamp.

The present invention also includes the use of two photo-electric cells for the quantitative adjustment and control of exposure prior to and during recording. One of these photo-electric cells is arranged in a non-modulated branch of light of the lamp and serves to permit continuous control of the intensity of the sinusoidal light light emitted by the lamp. Directly before making the record, the other photo-electric cell is selectively arranged in the modulated path of light between the modulating device and the record gap for controlling the modulating device. With regard to their color sensitivity, both the photo-electric cells are syntonized to the wave length of the source of light used for making the records (for instance with the potassium cell, for 4365 Å. U.).

According to the invention the determination and control of the light used for making the records is so effected that, before taking the record and without the modulation, the light to be used in making the record is measured through the modulating system by the last mentioned photo-electric cell and is adjusted accordingly. In this procedure the characteristic of the modulating device (for instance Kerr-cell) eventually is determined. While the record is being made this photo-electric cell again is removed from the path of the light beam and control of light intensity is effected by means of the photo-electric cell in the path of light diverted from the optical system in front of the modulating device.

In this manner, during the making of the record the intensity of the light, falling upon the recording slit may be absolutely quantitatively determined in elementary units and thereby a quantitatively defined exposure of the sound record strip is rendered possible.

To facilitate a better understanding of the present invention a specific embodiment thereof is illustrated in the accompanying drawing, wherein the monochromatic light source 10, such as is above described, is arranged to transmit a beam of light 11 through appropriate filters 12, a modulator such as a Kerr cell 13 and a recording slit 14 to a moving film 15. A light deflector 16 comprising a half-silvered prism block is interposed in the light path and serves to divert a portion of the beam to a photo-electric cell 17 which is connected to a light control device 18 used in adjusting the intensity of the light source. A second photo-electric cell 19, also electrically connected to the light control device 18, can be interposed in the optic axis of the system between the modulator 13 and the film 15.

In operation of the device the light control means 18 is adjusted in response to light intensity measurements made by the photo-electric cell 19 which, for the purpose, is interposed in the optic axis of the system. The primary adjustment is made in the absence of speech currents applied to the modulator. When a satisfactory adjustment has been made, the light intensity measured by the photocell 17 is noted in order that during recording the light control device 18 may be manipulated to maintain the desired intensity.

The method described may be used in an analogous manner in copying methods thus permitting control of the illumination of the negative during the copying operations.

I claim:

Method for controlling the intensity of the light source used in photographic sound recording that comprises photoelectrically measuring the intensity of the light beam after passage through the modulating means without modulation, adjusting the intensity of the light beam to a pre-selected value in accordance with this measurement, continuously diverting a portion of the light beam prior to modulation from the optic axis of the system, measuring the intensity of light thus diverted, and maintaining an average light intensity during recording equivalent to the light intensity of the unmodulated beam first measured by adjustment of the light intensity in accordance with measurements of the intensity of the diverted beam.

CARLHEINZ BECKER.